United States Patent [19]

Okazato et al.

[11] Patent Number: 4,723,832
[45] Date of Patent: Feb. 9, 1988

[54] COMPOSITE OVERHEAD CABLE STRUCTURE FOR ELECTRIC AND OPTICAL TRANSMISSION

[75] Inventors: Akira Okazato, Chiba; Yoshikatsu Honma, Funabashi; Hironori Yoshimura, Kashiwa; Toshiaki Kobayashi, Chiba, all of Japan

[73] Assignee: Fujikura Limited, Tokyo, Japan

[21] Appl. No.: 774,840

[22] Filed: Sep. 11, 1985

[30] Foreign Application Priority Data

Jun. 28, 1985 [JP] Japan .................. 60-140445

[51] Int. Cl.⁴ .............................................. G02B 6/44
[52] U.S. Cl. ................................ 350/96.23; 174/70 A
[58] Field of Search .......................... 174/70 A, 70 R; 350/96.23, 96.22

[56] References Cited

U.S. PATENT DOCUMENTS

| 4,272,155 | 6/1981 | Slaughter | 350/96.23 |
| 4,359,598 | 11/1982 | Dey et al. | 350/96.23 X |
| 4,375,313 | 3/1983 | Anderson et al. | 350/96.23 |
| 4,392,714 | 7/1983 | Bruggendieck et al. | 350/96.23 |
| 4,416,508 | 11/1983 | Dey et al. | 350/96.23 |
| 4,515,435 | 5/1985 | Anderson | 350/96.23 |
| 4,541,686 | 9/1985 | Barfuss et al. | 350/96.23 |

FOREIGN PATENT DOCUMENTS

| 2239742 | 2/1975 | France . |
| 2265103 | 10/1975 | France . |
| 51-45291 | 4/1976 | Japan . |
| 1457808 | 12/1976 | United Kingdom . |

OTHER PUBLICATIONS

"Principles of Fibre-Optical Cable Design", S. G. Foord, et al., Proc. IEE, vol. 123, No. 6, Jun. 1976, pp. 597-602.

"Optical Fiber Packaging and its Influence on Fiber Straightness and Loss", D. Bloge, *The Bell System Technical Journal*, vol. t4, No. 2, Feb. 1975, pp. 245-262.

*Primary Examiner*—Eugene R. LaRoche
*Assistant Examiner*—Steven J. Mottola
*Attorney, Agent, or Firm*—Armstrong, Nikaido, Marmelstein & Kubovcik

[57] ABSTRACT

A composite overhead cable structure for electric and optical transmission comprising a pipe, at least one layer of stranded metallic elongated conductor surrounding the outer periphery of said pipe in close contact with said outer periphery, and an optical fiber cable tightly disposed within and extending throughout the length of said pipe through the medium of a packing comprised of at least one double packing layer of a non-metallic soft packing layer and a non-metallic rigid packing layer, thereby providing fixed package of said optical fiber cable in said pipe through said packing so that said optical fiber is unmovable relative to said pipe. With such a structure, the optical fiber cable is effectively prevented from not only occurrence of local bending or, but also from suffering excessive lateral forces, which leads to elimination of a danger that the optical fiber be damaged, thereby enabling the optical transmission properties to be stably maintained.

17 Claims, 4 Drawing Figures

COMPOSITE OVERHEAD CABLE STRUCTURE FOR ELECTRIC AND OPTICAL TRANSMISSION

This invention relates to a composite overhead cable structure for electric and optical transmission. More particularly, the present invention is concerned with a composite overhead cable structure comprising a pipe, at least one layer of stranded metallic elongated conductor surrounding the outer periphery of said pipe in close contact with said outer periphery, and an optical fiber cable tightly packaged within and extending throughout the length of said pipe through the medium of a packing comprised of at least one double packing layer of a non-metallic soft packing layer and a non-metallic rigid packing layer, thereby enabling the optical fiber to be free from any damage caused by bending and distortion of the fiber.

Heretofore, there has been proposed a composite overhead cable structure for electrical and optical transmission in which an optical fiber cable is accommodated inside a pipe and a conductor made of a metal such as steel, aluminum, aluminum-coated steel or the like is fittedly stranded around the outer periphery of the pipe. In such a composite overhead cable structure, the optical fiber cable is housed inside the pipe positioned at the center of the stranded conductor and, therefore, the overhead cable structure as a whole has a substantially circular cross-section and can be rendered compact, leading to ease in handling and overhead installation of the overhead cable structure with advantages.

With respect to the above-mentioned composite overhead cable structure, it is well known to tightly package an optical fiber cable with a simple sheath therearound inside the pipe. With such a conventional tightly packaged structure, the optical fiber cable undergoes various forces which give rise to bending and distortion of the optical fiber, leading to damage of the optical fiber.

In order to overcome the drawbacks accompanying the above-mentioned conventional tightly packaged structure, there has been proposed a composite overhead cable structure in which an optical fiber cable is loosely packaged inside the pipe (see, for example, Japanese Patent Application Laid-Open Specification No. 53-24582/1978). However, such a loosely packaged structure also has various problems when it is actually in service. Illustratively stated, the optical fiber cable is apt to be subjected to local distortion under the repetition of temperature change. This is so because there is a large difference in coefficient of linear expansion between the stranded conductor and the optical fiber cable and, in addition, the optical fiber cable housed in the pipe is movable relative to the pipe and the stranded conductor fitted therearound in the longitudinal and lateral directions. That is, when the relaxation of the suspended composite overhead cable is increased or decreased due to the change in ambient temperature, there is caused a relative movement between the optical fiber cable and the pipe. Such a relative movement often tends to cause the optical fiber cable to locally touch upon the inner wall of the pipe strongly. Due to the increased frictional resistance in the portions where the optical fiber cable is in contact with the pipe, even after the returning of the relaxation of the suspended composite overhead cable to the original, the optical fiber cable cannot be returned to have the original positional relationship with respect to the pipe and the conductor fittedly stranded around the pipe and remains displaced. In this case, the tension of the optical fiber cable is not uniform through the entire length of the optical fiber cable, creating those portions which undergo tension larger or smaller than the average tension. The portions which undergo tension smaller than the average tension, that is, the loose portions, tend to develop to local bending or distortion due to repeated change of relaxation of the suspended composite overhead cable. The bending or distortion thus created impairs the transmission characteristics of the optical fiber cable and, in the worst case, causes the optical fiber to break.

In addition, there is another problem that the optical fiber cable undergoes excessive lateral forces in the case that the range of change of the relaxation of the suspended composite overhead cable is extremely large and in the case that external impact is applied to the suspended composite overhead cable. For example, when large change occurs in the relaxation of the suspended composite overhead cable, the optical fiber cable is pressed in a radial direction thereof by the action of the pipe so that the optical fiber cable undergoes excessive lateral forces, and when the suspended composite overhead cable suffers vibration or oscillation such as galloping oscillation, the optical fiber is caused to strongly collide with the inner peripheral wall of the pipe so that the optical fiber cable undergoes excessive lateral forces. The excessive lateral forces bring about a large stress in the optical fiber cable, leading to damage on the transmission characteristics of the composite overhead cable and/or breakage of the optical fiber.

Accordingly, it is an object of the present invention to provide a composite overhead cable structure in which the optical fiber cable housed in a pipe does neither suffer excessive lateral forces nor undergo local bending or distortion, so that not only the transmission characteristics of the optical fiber cable is not impaired but also the optical fiber is free from breakage.

With a view to developing a new composite overhead cable structure which is free from the above-mentioned drawbacks inevitably accompanying the conventional composite overhead cable structure of the similar kind and have high durability, the present inventors have made extensive and intensive studies. As a result, the present invention has been made.

The foregoing and other objects, features and advantages of the present invention will be apparent to those skilled in the art from the following detailed description and appended claims taken in connection with the accompanying drawings in which:

Figure 4:
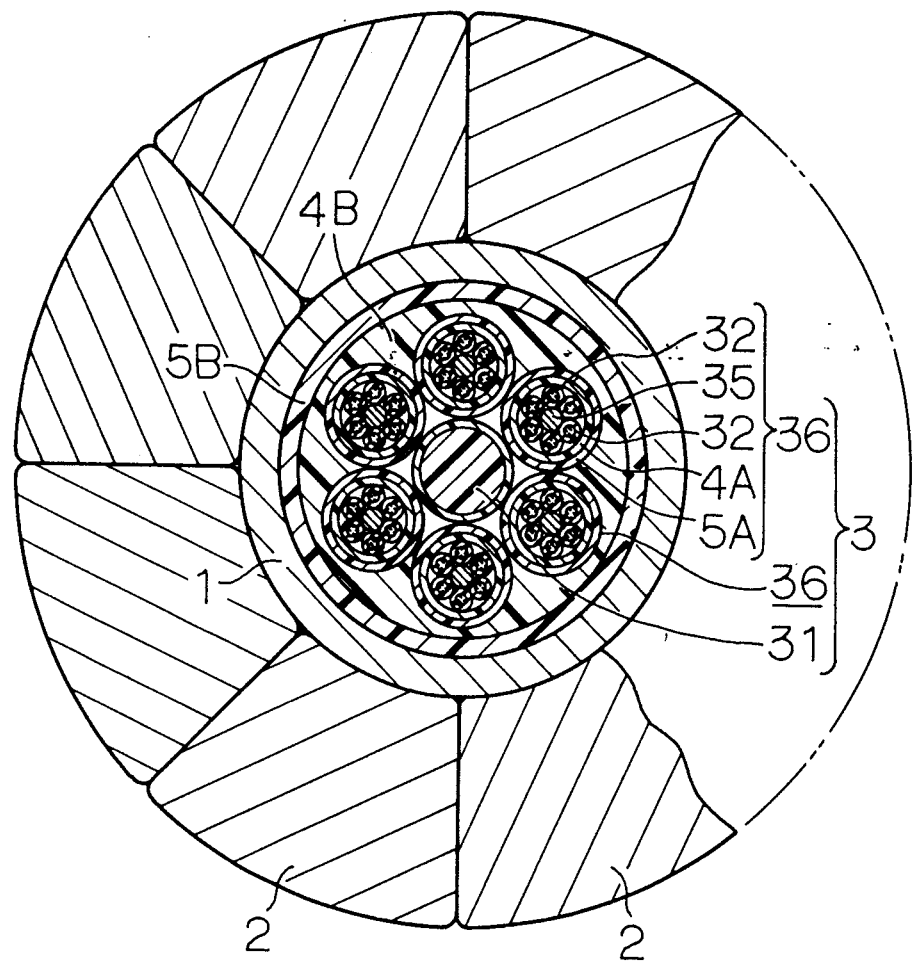
Figure 3:
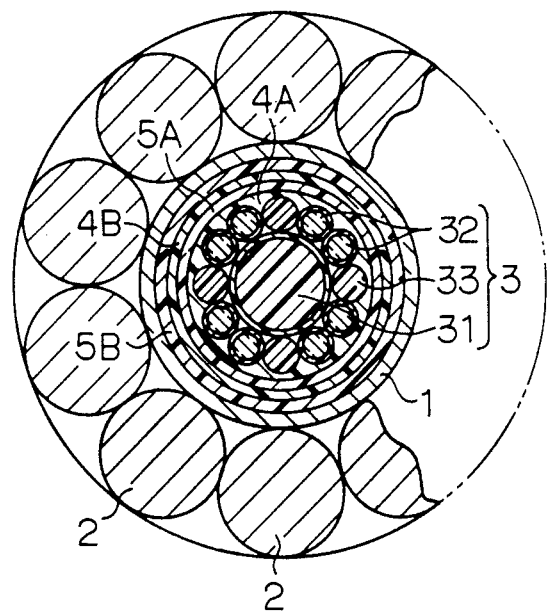

FIG. 3 is a diagrammatic cross-sectional view of still another form of a composite overhead cable structure embodying the present invention in which still another type of optical fiber cable is tightly packaged in a pipe through a packing comprised of two double packing layers; and FIG. 4 is a diagrammatic cross-sectional view of a further form of a composite overhead cable structure in which a further type of optical fiber cable is tightly packaged in a pipe through a packing and a helically wound conductor having a cross-section substantially of a sector of an annulus is employed.

In FIGS. 1 to 4, like parts or portions are designated by like numerals.

Essentially, according to the present invention, there is provided a composite overhead cable structure comprising:

a pipe;

at least one layer of stranded metallic elongated conductor surrounding the outer periphery of said pipe in close contact with said outer periphery;

an optical fiber cable disposed within and extending throughout the length of said pipe; and, tightly disposed within and extending throughout the length of an elongated space defined by the inner peripheral wall of said pipe and the outer peripheral wall of said optical fiber cable and superposed on the outer periphery of said optical fiber cable, a packing comprised of at least one double packing layer of a non-metallic soft packing layer and a non-metallic rigid packing layer arranged in this order;

said packing having its innermost and outermost layers which are composed of a non-metallic soft packing layer and a non-metallic rigid packing layer, respectively;

said innermost layer being in close contact, at its surface, with the outer peripheral wall of said optical fiber cable and said outermost layer being in close contact, at its surface, with the inner peripheral wall of said pipe;

thereby providing fixed package of said optical fiber cable in said pipe through said packing.

In the composite overhead cable structure, an optical fiber cable is fixedly packaged in a pipe through a packing comprised of at least one double packing layer of a non-metallic soft packing layer and a non-metallic rigid packing layer arranged in this order so that the optical fiber cable is unmovable relative to the pipe and, therefore, relative to a conductor helically wound around the pipe in fixed relationship even when the relaxation of the suspended composite overhead cable is changed. With such a structure as mentioned above, occurrence of local bending or distortion of the optical fiber cable is effectively prevented. On the other hand, when the range of change of relaxation of the suspended composite overhead cable is extremely large and/or external impact is applied to the suspended composite overhead cable, lateral forces are exerted so as to forcibly press the optical fiber cable in a radial direction thereof. With the above-mentioned structure, however, one or more non-metallic rigid packing layers of which the outermost layer is in close contact with the inner peripheral wall of the pipe receive the lateral forces to suppress the propagation of the forces to the inside and, at the same time, one or more non-metallic soft packing layers of which the innermost layer is in close contact with the outer peripheral wall of the optical fiber cable absorb the remaining forces which could give rise to distortion of the optical fiber cable, thereby to diminish or negate the forces. Thus, the optical fiber cable can be effectively prevented from suffering excessive lateral forces. Accordingly, there is completely eliminated a danger that the optical fiber is damaged, thereby enabling the optical transmission properties to be stably maintained.

Figure 1:
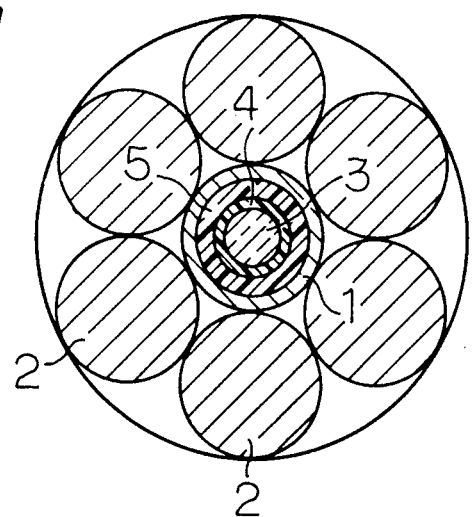
FIG. 1 is a diagrammatic cross-sectional view of one form of a composite overhead cable structure embodying the present invention.

Referring now to FIG. 1, there is shown a diagrammatic view of one form of a composite overhead cable according to the present invention.

Around the outer periphery of a pipe 1 is surrounded a stranded metallic elongated conductor 2 in fixed relationship. An optical fiber cable 3 is disposed within and extending throughout the length of the pipe 1. The optical fiber cable may be in the form of an optical element composed of a core and a clad, or may be in the form of a buffered optical fiber comprising an optical element composed of a core and a clad and a buffer coating formed thereon or a sheathed optical fiber comprising an optical element composed of a core and a clad and, applied thereonto in the following order, a buffer coating and a sheath. Within and extending throughout the length of an elongated space defined by the inner peripheral wall of said pipe 1 and the outer peripheral wall of said optical fiber cable 3 is tightly disposed a packing comprised of a double packing layer of a non-metallic soft packing layer 4 and a non-metallic rigid packing layer 5 in a positional relationship that the packing is superposed on the outer periphery of the optical fiber cable 3 and the non-metallic soft packing layer 4 and the non-metallic rigid packing layer 5 are arranged in this order. In the above-mentioned positional relationship, the non-metallic soft packing layer 4 is in close contact, at its surface, with the outer peripheral wall of the optical fiber cable 3, and the non-metallic rigid packing layer 5 is in close contact, at its surface, with the inner peripheral wall of the pipe 1. Thus, there is provided fixed package of the optical fiber cable 3 in the pipe 1 through the packing so that the optical fiber cable 3 is unmovable relative to the pipe 1.

The pipe 1 may be made by a method in which a metallic tape of aluminum, copper or steel is inwardly bent by a die to a circular shape in cross-section and the fissure portion is welded or a method in which a metal or metal alloy, or rigid synthetic resin is extrusion-molded into a pipe.

Each conductor 2 may be one which is obtained by stranding a simple elongated element made of aluminum, copper or steel and having a circular or polygonal shape in cross-section, or a composite elongated element which is formed of steel coated with copper and has a circular or polygonal shape in cross-section.

The soft packing layer 4 may be of a non-metallic material having a Young's modulus of 0.01 to 5 $Kg/mm^2$. The soft packing layer 4 may be in the form of a coat formed by coating the optical fiber cable 3 with a soft synthetic resin such as an epoxy resin, polyurethane resin, silicone resin or the like by extrusion or dipping. Alternatively, the soft packing layer 4 may be a layer formed by helically winding a yarn, strand or tape of a polypropylene resin or the like around the optical fiber cable 3 or laminating a tape of a polypropylene resin or the like around the optical fiber cable along its length.

The rigid packing layer 5 may be of a non-metallic material having a Young's modulus of 20 to 400 $kg/mm^2$. The rigid packing layer 5 may be in the form of a coat formed by coating the soft packing layer 4 on the optical fiber cable 3 with a rigid synthetic resin, such as an epoxy resin, polyurethane resin, Teflon resin, nylon resin or the like by extrusion or dipping. Alternatively, the rigid packing layer 5 may be a layer formed by helically winding a yarn, strand or tape of a polyimide resin, polyester resin or the like around the soft packing layer 4 on the optical fiber cable 3 or laminating a tape of a polypropylene resin or the like around the soft packing layer 4 on the optical fiber cable along its length.

In the composite overhead cable structure of the present invention, the optical fiber cable 3 is tightly disposed in the pipe 1 through the packing and, hence, in each of the contact faces between the adjacent members, namely, between the optical fiber cable 3 and the soft packing layer 4, between the soft packing layer 4 and the rigid packing layer 5 and between the rigid packing layer 5 and the pipe 1 there is exerted a large frictional force with respect to the axial pulling of each member. In order that the frictional force becomes surely sufficient for the optical fiber cable 3 to be unmovable relative to the pipe 1, there may be additionally adopted various methods. For example, the pipe 1 having, incorporated therein, the optical fiber cable 3 and the packing comprised of at least one double layer of the soft packing layer 4 and the rigid packing layer 5 may be drawn through a die several times so that pressing force between the adjacent members is increased; an adhesive or a tape having adhesive surfaces on both sides thereof may be applied between the adjacent members so that the adjacent members are fixedly attached to each other; or the inner peripheral wall surface of the pipe 1 may be roughened.

Figure 2:
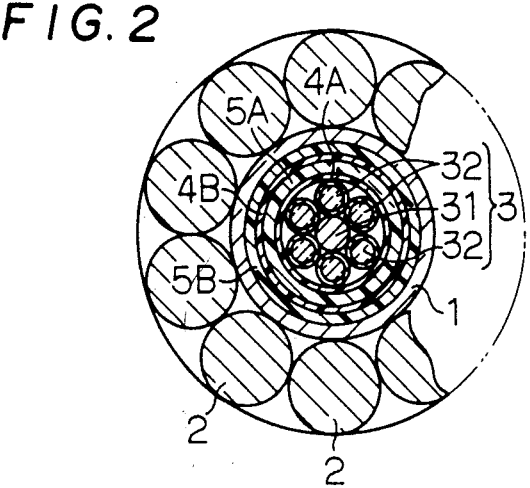
FIG. 2 is a diagrammatic cross-sectional view of another form of a composite overhead cable structure embodying the present invention in which another type of optical fiber cable is tightly packaged in a pipe through a packing comprised of two double packing layers.

Referring to FIG. 2, there is shown a diagrammatic cross-sectional view of another form of a composite overhead cable structure embodying the present invention in which another type of optical fiber cable is tightly packaged in a pipe through a packing comprised of two double packing layers. In this embodiment, a plurality of buffered optical fibers 32 each comprising an optical element composed of a core and a clad and a buffer coating formed thereon or a plurality of sheathed optical fibers 32 each comprising an optical element composed of a core and a clad and, applied thereonto in the following order, a buffer coating and a sheath are stranded around a central member 31 made of a steel wire, a fiber reinforced plastic filament or the like to form an optical fiber cable 3. Between the optical fiber cable 3 and the pipe 1 are tightly disposed two non-metallic soft packing layers 4A, 4B and two rigid packing layers 5A, 5B which are alternately arranged. The outer surface of the rigid packing layer 5B as the outermost layer is in contact with the inner peripheral layer of the pipe 1 whereas the inner surface of the soft packing layer 4A as the innermost layer is in contact with the outer peripheral wall of the optical fiber cable 3. Through the packing layers 4A, 5A, 4B and 5B is tightly disposed the optical fiber cable 3 in the pipe 1, so that the optical fiber cable 3, the pipe 1 and the conductor 2 are unmovable relative to one another. The other constructions of this embodiment are the same as those of the first embodiment described with respect to FIG. 1.

Referring to FIG. 3, there is shown a diagrammatic cross-sectional view of still another form of a composite overhead cable structure embodying the present invention in which still another type of optical fiber cable is tightly packaged in a pipe through a packing comprised of two double packing layers. In this embodiment, a plurality of buffered optical fibers 32 each comprising an optical element composed of a core and a clad and a buffer coating formed thereon or a plurality of sheathed optical fibers 32 each comprising an optical element composed of a core and a clad and, applied thereonto in the following order, a buffer coating and a sheath are stranded, together with a filling member 33 made of a filament of a relative high tensile strength material such as a nylon resin, fiber reinforced plastics or metal, around a central member 31 to form an optical fiber cable 3. A central member 31 is made of, for example, a steel wire, and has a sheath made of a fiber reinforced plastics, nylon resin or the like. The soft packing layer 4A as the innermost layer of the packing covers the optical fiber cable 3. The recesses on the periphery of the optical fiber cable 3 which are formed by the stranding of the buffered optical fibers or sheathed optical fibers 32 together with the filling members 33 are also filled with corresponding portions of the soft packing layer 4A. The other constructions of this embodiment are the same as those of the first and second embodiments described with respect to FIGS. 1 and 2, respectvely.

Referring to FIG. 4, there is shown a diagrammatic cross-sectional view of a further form of a composite overhead cable structure in which a further type of optical fiber cable is tightly packaged in a pipe through a packing, and a helically wound conductor having a cross-section substantially of a sector of an annulus is employed. In this embodiment, a plurality of buffered optical fibers 32 each comprising an optical element composed of a core and a clad and a buffer coating formed thereon or a plurality of sheathed optical fibers 32 each comprising an optical element composed of a core and a clad and, applied thereonto in the following order, a buffer coating and a sheath are stranded around a central core 35 which is made of, for example, a steel wire, a fiber reinforced plastic filament or the like. Around the stranded buffered optical fibers or sheathed optical fibers are laid a soft packing layer 4A functioning as the innermost packing layer and a rigid packing layer 5A as the next packing layer to form an optical fiber cable unit 36. A plurality of the optical fiber cable units 36 are stranded around a central member 31 which is made of, for example, a steel wire, and has a sheath made of a fiber reinforced plastics, nylon resin or the like, to form an optical fiber cable 3. Around the optical fiber cable 3 is laid a soft packing layer 4B and a rigid packing layer 5B in this order. The rigid packing layer 5B is in close contact with the inner peripheral wall of the pipe 1. Since the packing layers 5A and 5B are tightly packed around the stranded optical fiber cable units 36 in the pipe 1, the optical fiber cable 3 (which comprises of the optical fiber cable units 36), the pipe 1 and the conductor 2 are unmovable relative to one another. The other aspects of this embodiment are the same as those of the first embodiment described with repect FIG. 1.

As described, according to the present invention, an optical fiber cable is fixedly packaged in a pipe through a packing comprised of at least one double packing layer of a non-metallic soft packing layer and a non-metallic rigid packing layer arranged in this order so that the optical fiber cable is unmovable relative to the pipe and, therefore, relative to a conductor helically wound around the pipe in fixed relationship even when the relaxation of the suspended composite overhead cable is changed due to the change in ambient temperature. With such a composite overhead cable structure of the present invention, occurrence of local bending or distortion of the optical fiber cable is effectively prevented. On the other hand, when the range of change of relaxation of the suspended composite overhead cable is extremely large and/or external impact is applied to the suspended composite overhead cable, lateral forces are exerted so as to forcibly press the optical fiber cable in a radial direction thereof. With the above-mentioned structure, however, one or more non-metallic rigid packing layers of which the outermost layer is in close contact with the inner peripheral wall of the pipe receive the lateral forces to suppress the propagation of the forces to the inside and, at the same time, one or more non-metallic soft packing layers of which the innermost layer is in close contact with the outer peripheral wall of the optical fiber cable absorb the remaining forces which could give rise to distortion of the optical fiber cable, thereby to diminish or negate the forces. Thus, the optical fiber cable can be effectively prevented from suffering excessive lateral forces. Accordingly, there is completely eliminated a danger that the optical fiber is damaged, thereby enabling the optical transmission properties to be stably maintained.

What is claimed is:

1. A composite overhead cable structure comprising:
   a pipe having a length and an outer peripheral wall and an inner peripheral wall;
   at least one layer of stranded metallic elongated conductor surrounding the outer peripheral wall of said pipe in close contact with said outer peripheral wall;
   an optical fiber cable having an outer peripheral wall and being disposed within and extending throughout the length of said pipe; and,
   tightly disposed within and extending throughout the length of an elongated space defined by the inner peripheral wall of said pipe and the outer peripheral wall of said optical fiber cable and superposed on the outer peripheral wall of said optical fiber cable, a packing comprised of at least one double packing layer of a non-metallic soft packing layer having a Young's modulus of 0.01 to 5 $Kg/mm^2$ and a non-metallic rigid packing layer having a Young's modulus of 20 to 400 $Kg/mm^2$ arranged in this order, said non-metallic rigid packing layer being contiguous to said non-metallic soft packing layer;
   said packing having its innermost and outermost layers which are composed of a non-metallic soft packing layer and a non-metallic rigid packing layer, respectively;
   said innermost layer being in close contact, at its surface, with the outer peripheral wall of said optical fiber cable and said outermost layer being in close contact, at its surface, with the inner peripheral wall of said pipe;
   thereby providing fixed package of said optical fiber cable in said pipe through said packing.

2. A cable structure according to claim 1, wherein said soft packing layer is in the form of a coat applied by extrusion or dipping.

3. A cable structure according to claim 1, wherein said soft packing layer is in the form of a layer of helically wound yarn, strand or tape or in the form of a layer of laminated tape applied along the length of the optical fiber cable.

4. A cable structure according to claim 1, wherein said rigid packing layer is in the form of a coat applied by extrusion or dipping.

5. A cable structure according to claim 1, wherein said rigid packing layer is in the form of a layer of helically wound yarn, strand or tape or in the form of a layer of laminated tape applied along the length of the optical fiber cable.

6. A cable structure according to claim 1, wherein said packing is composed of a plurality of soft packing layers and a plurality of rigid packing layers arranged alternately.

7. A cable structure according to claim 1, wherein said optical fiber cable is in the form of a buffered optical fiber comprising an optical element composed of a core and a clad and a buffer coating formed thereon.

8. A cable structure according to claim 1, wherein said optical fiber cable is in the form of a sheathed optical fiber comprising an optical element composed of a core and a clad and, applied thereonto in the following order, a buffer coating and a sheath.

9. A cable structure according to claim 1, wherein said optical fiber cable is in the form of a plurality of buffered optical fibers stranded, each buffered optical fiber comprising an optical element composed of a core and a clad and a buffer coating formed thereon.

10. A cable structure according to claim 1, wherein said optical fiber cable is in the form of a plurality of sheathed optical fibers stranded, each sheathed optical fiber comprising an optical element composed of a core and a clad and, applied thereonto in the following order, a buffer coating and a sheath.

11. A cable structure according to claim 9, wherein said buffered optical fibers are stranded around an elongated central member.

12. A cable structure according to claim 10, wherein said sheathed optical fibers are stranded around an elongated central member.

13. A cable structure according to claim 9, wherein said buffered fibers are stranded, together with at least one elongated filling member made of a relatively high tensile strength material, around an elongated central member.

14. A cable structure according to claim 10, wherein said sheathed optical fibers are stranded, together with at least one elongated filling member made of a relatively high tensile strength material, around an elongated central member.

15. A cable structure according to claim 1, wherein said optical fiber cable is in the form of a plurality of optical fiber cable units stranded around an elongated central member, each optical fiber cable unit being composed of a plurality of buffered optical fibers stranded around an elongated central core and, laid therearound in the following order, a soft packing layer and a rigid packing layer, each buffered optical fiber comprising an optical element composed of a core and a clad and a buffer coating formed thereon.

16. A cable structure according to claim 1, wherein said optical fiber cable is in the form of a plurality of optical fiber cable units stranded around an elongated central member, each optical fiber cable unit being composed of a plurality of sheathed optical fibers stranded around an elongated central core and, laid therearound in the following order, a soft packing layer and a rigid packing layer, each sheathed optical fiber comprising an optical element composed of a core and a clad and, applied thereonto in the following order, a buffer coating and a sheath.

17. A cable structure according to any one of claims 9 to 16, wherein said optical fiber cable has, on its periphery, recesses formed by the stranding, each recess being filled with a corresponding portion of the soft packing layer positioned in close contact with said optical fiber cable.

* * * * *